（12) United States Patent
Marker et al.

(10) Patent No.: US 12,403,439 B2
(45) Date of Patent: Sep. 2, 2025

(54) ELECTRICALLY HEATED REFORMING REACTOR FOR REFORMING OF METHANE AND OTHER HYDROCARBONS

(71) Applicant: Gas Technology Institute, Des Plaines, IL (US)

(72) Inventors: Terry Marker, Park Ridge, IL (US); Jim Wangerow, Oak Park, IL (US); Martin Linck, Wilmette, IL (US)

(73) Assignee: GTI Energy, Des Plaines, IL (US)

( * ) Notice: Subject to any disclaimer, the term of this patent is extended or adjusted under 35 U.S.C. 154(b) by 1053 days.

(21) Appl. No.: 17/402,865

(22) Filed: Aug. 16, 2021

(65) Prior Publication Data

US 2022/0134298 A1    May 5, 2022

Related U.S. Application Data

(60) Provisional application No. 63/107,537, filed on Oct. 30, 2020.

(51) Int. Cl.
*B01J 8/02* (2006.01)
*B01J 19/08* (2006.01)
(Continued)

(52) U.S. Cl.
CPC ............. *B01J 8/0285* (2013.01); *C01B 3/342* (2013.01); *B01J 2208/00132* (2013.01);
(Continued)

(58) Field of Classification Search
None
See application file for complete search history.

(56) References Cited

U.S. PATENT DOCUMENTS 3,147,080 A    9/1964  Jahnig
8,915,981 B2   12/2014 Marker et al.
(Continued)

FOREIGN PATENT DOCUMENTS

EP    3075704 B1    2/2016
EP    3720810 A1   10/2020
(Continued)

OTHER PUBLICATIONS

Jan. 3, 2022—(WO) International Search Report and Written Opinion—App PCT/US21/46115.

*Primary Examiner* — Joseph D Anthony
(74) *Attorney, Agent, or Firm* — Banner & Witcoff, Ltd.

(57) ABSTRACT

Electrically heated reforming reactors and associated reforming processes are disclosed, which benefit from a number of advantages in terms of attaining and controlling the input of heat to catalytic conversion processes such as in the reforming of hydrocarbons (e.g., methane) using $H_2O$ and/or $CO_2$ as an oxidant. The disclosed reactors provide the ability to target the input of heat to specific regions within a catalyst bed volume. This allows for the control of the temperature profile in one or more dimensions (e.g., axially and/or radially) and/or otherwise tailoring heat input for processing specific reformer feeds, achieving specific reformer products, effectively utilizing the catalyst, and/or compensating for a number of operating parameters (e.g., flow distribution). Dynamic control of the heat input may be used in response to changes in feed or product composition and/or catalyst activity.

20 Claims, 6 Drawing Sheets (51) Int. Cl.
  *C01B 3/34* (2006.01)
  *C01B 3/38* (2006.01)
(52) U.S. Cl.
  CPC .............. *B01J 2208/0015* (2013.01); *B01J 2208/00398* (2013.01); *B01J 2208/0053* (2013.01); *C01B 2203/085* (2013.01); *C01B 2203/1241* (2013.01)

(56) References Cited

U.S. PATENT DOCUMENTS

| | | | |
|---|---|---|---|
| 9,314,761 B2* | 4/2016 | Tetzlaff | ................ B01J 8/067 |
| 9,908,091 B2 | 3/2018 | Vogel et al. | |
| 2006/0124445 A1 | 6/2006 | Labrecque et al. | |
| 2012/0025140 A1 | 2/2012 | Tetzlaff | |
| 2015/0129805 A1* | 5/2015 | Karpenko | ............. B01J 23/892 |
| | | | 252/373 |
| 2016/0288074 A1 | 10/2016 | Vogel et al. | |
| 2017/0101312 A1 | 4/2017 | Mihailowitsch | |
| 2021/0113983 A1* | 4/2021 | Mortensen | .............. B01J 19/32 |
| 2022/0002154 A1* | 1/2022 | Dennis | ................... C01B 3/48 |

FOREIGN PATENT DOCUMENTS

| | | | |
|---|---|---|---|
| JP | S58219945 A | 12/1983 |
| KR | 20140140562 A | 12/2014 |
| WO | 2004041425 A1 | 5/2004 |
| WO | 2019110266 A1 | 6/2019 |
| WO | 2019228796 A1 | 12/2019 |
| WO | 2019228797 A1 | 12/2019 |
| WO | 2019228798 A1 | 12/2019 |

\* cited by examiner

ELECTRICALLY HEATED REFORMING REACTOR FOR REFORMING OF METHANE AND OTHER HYDROCARBONS

CROSS-REFERENCE TO RELATED APPLICATIONS

This application claims priority to U.S. provisional application No. 63/107,537, filed Oct. 30, 2020, which is incorporated by reference in its entirety.

FIELD OF THE INVENTION

Aspects of the invention relate to reforming reactors having operational flexibility in terms of establishing and managing heat input to a catalyst bed within such reactors, as well as compactness and transportability for processing reformer feeds in various locations, preferably without the generation of $CO_2$ that accompanies combustion in a conventional reforming reactor furnace.

DESCRIPTION OF RELATED ART

The ongoing search for alternatives to crude oil, for the production of hydrocarbon fuels is increasingly driven by a number of factors. These include diminishing petroleum reserves, higher anticipated energy demands, and heightened concerns over greenhouse gas (GHG) emissions from sources of non-renewable carbon. In view of its abundance in natural gas reserves, as well as in gas streams obtained from biological sources (biogas), methane has become the focus of a number of possible routes for providing liquid hydrocarbons. A key commercial process for converting methane into fuels involves a first conversion step to produce synthesis gas (syngas), followed by a second, downstream Fischer-Tropsch (FT) synthesis step. In this second step, the synthesis gas containing a mixture of hydrogen ($H_2$) and carbon monoxide (CO) is subjected to successive cleavage of C—O bonds and formation of C—C bonds with the incorporation of hydrogen. This mechanism provides for the formation of hydrocarbons, and particularly straight-chain alkanes, with a distribution of molecular weights that can be controlled to some extent by varying the FT reaction conditions and catalyst properties. Otherwise, FT synthesis can be used with known operating parameters to produce oxygenates, and in particular lower alcohols such as methanol.

Aside from its use as a precursor for liquid hydrocarbons and/or oxygenates, syngas is also demanded, particularly in the refining industry, as a source of hydrogen. For example, hydrogen needs have increased together with increasing emphasis on meeting clean fuel requirements through hydrogen-consuming processes, such as hydrodesulfurization.

With respect to the first conversion step described above, known processes for the production of syngas from methane include partial oxidation reforming and autothermal reforming (ATR), based on the exothermic oxidation of methane with oxygen. Steam methane reforming (SMR), in contrast, uses steam as the oxidizing agent, such that the thermodynamics are significantly different, not only because the production of steam itself can require an energy investment, but also because reactions involving methane and water are endothermic. More recently, it has also been proposed to use carbon dioxide ($CO_2$) as the oxidizing agent for methane, such that the desired syngas is formed by the reaction of carbon in its most oxidized form with carbon in its most reduced form, according to:

$$CH_4 + CO_2 \rightarrow 2CO + 2H_2.$$

This reaction has been termed the "dry reforming" of methane, and because it is highly endothermic, thermodynamics for the dry reforming of methane are less favorable compared to ATR or even SMR. However, the stoichiometric consumption of one mole of carbon dioxide per mole of methane has the potential to reduce the overall carbon footprint of liquid fuel production, providing a "greener" consumption of methane. This $CO_2$ consumption rate per mole of feed increases in the case of reforming higher hydrocarbons (e.g., $C_2$-$C_6$ paraffins). In any event, the thermodynamic barrier remains a major challenge and relates to the fact that $CO_2$ is completely oxidized and very stable, such that significant energy is needed for its activation as an oxidant.

Known processes for reforming of methane and other hydrocarbons to produce synthesis gas, using $H_2O$ and/or $CO_2$ as oxidants, can therefore require temperatures as high as 1000° C. (1832° F.). Such temperatures are typically achieved in a combustion furnace surrounding multiple vertically aligned tubes filled with reforming catalyst. A portion of the hydrocarbon that is otherwise fed to the parallel tubes, as the gaseous reformer feed that also includes the oxidant(s), is used instead as a source of the needed combustion heat and, in this capacity, burned with oxygen in the furnace. This gas fired heating, however, requires large and complex system infrastructure to install and support. These constraints can be especially unsuitable for smaller scale reforming operations, in which a simple and compact reactor design would be of greater value and desirable for practicality. According to U.S. Pat. No. 3,147,080; US 2016/0288074; and US 2017/0101312, the art has proposed the use of electricity for heating of the catalyst-filled tubes of a reforming reactor, such as to provide a portion of needed heat to the catalyst, in combination with radiant combustion heat. According to WO 2019/228796 and WO 2019/228797, an electrically conductive material is coated with a ceramic coating that supports a catalytically active material. There nonetheless remains a need for apparatuses and their use in high-temperature conversion processes such as reforming, which provide for the effective establishment and management of heat input into the catalyst bed.

SUMMARY OF THE INVENTION

Aspects of the invention are associated with the discovery of electrically heated reactors and associated reforming processes that benefit from a number of advantages, in terms of attaining and controlling the input of heat to catalytic conversion processes such as in the reforming of hydrocarbons (e.g., methane) using $H_2O$ and/or $CO_2$ as an oxidant. Through resistive or inductive heating, electricity may be used to quickly and efficiently raise the temperature of a catalyst bed, for example from ambient temperature following catalyst loading to a reaction temperature exceeding 500° C. (932° F.), 700° C. (1292° F.), or even 850° C. (1562° F.). Other advantages reside in the ability to target the input of heat to specific regions within a catalyst bed volume, for achieving a number of processing objectives. These include controlling a temperature profile in one or more dimensions (e.g., axially and/or radially) and/or otherwise tailoring heat input for processing specific reformer feeds, achieving specific reformer products, effectively utilizing the catalyst, and/or compensating for a number of operating parameters (e.g., flow distribution). Dynamic control of the heat input may be used in response to changes in feed or product composition and/or catalyst activity.

Other advantages reside the ability to forego a conventional reactor furnace and associated equipment (e.g., burners), as well as eliminate $CO_2$ emissions from fuel combustion. In the case of renewable electricity (e.g., obtained from sun or wind energy) being available for heat generation, the carbon footprint associated with reforming/syngas production may be further reduced or even eliminated. Yet other advantages may be realized from the increased simplicity of the disclosed electrically heated reforming reactors, compared to those that require gas-fired furnaces, such that the inventive reactors may be compact and even transportable (e.g., skid mounted). This allows the reactors and possibly other associated equipment (e.g., a downstream Fischer-Tropsch synthesis reactor), according to some embodiments, to be conveyed to where they are effectively utilized, including sites where sources of hydrocarbons such as natural gas (e.g., wellhead gas) are available. Such sources are often "stranded," meaning they lack access to a suitable facility for conversion to value-added products and are therefore generally flared (combusted). Processes described herein can effectively monetize such otherwise unusable sources of methane and other hydrocarbons.

Particular embodiments of the invention are directed to an electrically heated reforming reactor comprising an outer shell defining an interior space that includes a catalyst bed volume for containing catalyst. The reforming reactor may further comprise a plurality of heating elements extending partly or completely through the catalyst bed volume and configured for heating separate regions within the catalyst bed volume. In other embodiments, the reforming reactor may further comprise at least one heating element extending unidirectionally through the catalyst bed volume and configured for heating the catalyst bed volume. Other particular embodiments are directed to reforming processes, for example processes for producing a synthesis gas product, using an electrically heated reforming reactor as described herein. Representative processes may comprise contacting a reformer feed comprising both (i) a hydrocarbon and (ii) $H_2O$ and/or $CO_2$ with a catalyst that is disposed in the catalyst bed volume of the electrically heated reforming reactor, in which a plurality of heating elements extends partly or completely through the catalyst bed volume, and therefore partly or completely through the catalyst bed itself. The processes may further comprise causing different heating elements, such as heating elements disposed at different radial positions and/or heating elements disposed at different axial positions, to provide different rates of heat to the catalyst. Following the contacting of the reformer feed with the catalyst, a synthesis gas product is produced, which is withdrawn from the catalyst bed and from the reactor.

According to other particular embodiments, the heating elements may be in the form of solid wires or rods that do not contain or surround catalyst particles or otherwise any empty space within the catalyst bed volume. The heating elements may, in some embodiments, be structurally distinct from the catalyst, meaning that the catalyst is not coated or otherwise affixed onto the heating elements. The heating elements may, in some embodiments, be electrically insulated, although not thermally insulated, from the catalyst, such that the catalyst does not itself become heated directly by resistive heating (i.e., by the application of voltage through the catalyst itself) or heated directly by inductive heating (i.e., by inducing eddy currents in the catalyst itself). In preferred embodiments, the catalyst is in the form of a fixed bed of catalyst particles, through which one or a plurality of the heating elements extend, either partly or completely.

These and other embodiments, aspects, and advantages relating to the present invention are apparent from the following Detailed Description.

BRIEF DESCRIPTION OF THE DRAWINGS

A more complete understanding of the exemplary embodiments of the present invention and the advantages thereof may be acquired by referring to the following description in consideration of the accompanying figures, in which the same reference numbers are used to identify the same or similar features.

In FIG. 1A, the vertical direction may be parallel to the plane of the page, dividing the reactor into front and back sections, and may be perpendicular to a central plane A'-A" dividing the reactor into top and bottom sections.

In FIG. 2A, the horizontal direction may be parallel to the plane of the paper, dividing the reactor into front and back sections, and may also be parallel to a central plane A'-A" dividing the reactor into top and bottom sections.

The figures should be understood to present simplified illustrations of electrically heated reforming reactors, as well as flows of reactants and products undergoing reaction, in order to facilitate explanation and understanding. These figures and elements shown are not necessarily drawn to scale. Valves, instrumentation, and other equipment and systems not essential to the understanding of the various aspects of the invention are not shown. As is readily apparent to one of skill in the art having knowledge of the present disclosure, electrically heated reforming reactors and processes utilizing these reactors will have configurations and elements determined, in part, by their specific use. Moreover, whereas the figures illustrate specific embodiments having a number of elements in combination, this is not intended to limit the scope of invention as defined by claims requiring fewer elements and/or different combinations of elements as would nonetheless be apparent to one of skill in the art having knowledge of the present disclosure.

DETAILED DESCRIPTION

The expressions "wt-%" and "mol-%," are used herein to designate weight percentages and molar percentages, respectively. The expressions "wt-ppm" and "mol-ppm" designate weight and molar parts per million, respectively. For ideal gases, "mol-%" and "mol-ppm" are equal to percentages by volume and parts per million by volume, respectively.

The term "reformer feed" refers to a composition comprising at least (i) one or more hydrocarbons such as methane and (ii) as an oxidant, $H_2O$, $CO_2$, or a combination thereof. The reformer feed is subjected, by contact with a catalyst as described herein, to steam reforming in the case of $H_2O$ as the oxidant, dry reforming in the case of $CO_2$ as the oxidant, or $CO_2$-steam reforming in the case of both oxidants being present in the reformer feed. The term "reformer product" refers to a composition that is the reaction product obtained following the contacting of the reformer feed with the catalyst. Conversion of the hydrocarbon(s) and oxidant(s) initially present in the reformer feed generally results in the depletion in concentration of these components in the reformer product, relative to the reformer feed, and also generally results in the enrichment in concentration of the conversion products CO and $H_2$ in the reformer product, relative to the reformer feed. Accordingly, the term "synthesis gas product" is used to refer to a particular reformer product. The term "gaseous mixture" refers to a composition within the catalyst of a reforming reactor as it is undergoing conversion from a reformer feed to a reformer product (e.g., synthesis gas product). The gaseous mixture has components of both the reformer feed and reformer product, generally in intermediate concentrations, relative to those of the reformer feed and reformer product. Under conditions (e.g., temperatures and pressures) used for reforming, the gaseous mixture is completely or at least predominantly in the gas phase. However, the term "gaseous mixture" does not preclude the presence of compounds in this mixture that, like water, are liquid under conditions of ambient temperature and pressure. Such compounds can also include hydrocarbons found in liquid fuels including naphtha and jet fuels, for example $C_6$-$C_{16}$ hydrocarbons, in the case of reforming these compounds.

Electrically Heated Reforming Reactors and Heating Elements

Figure 1A:
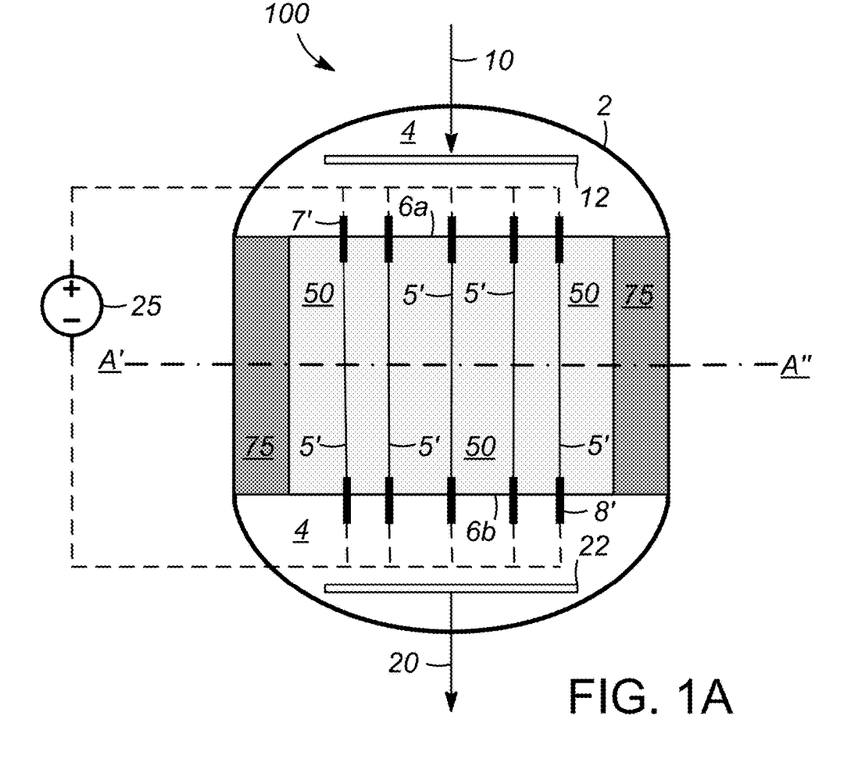
FIGS. 1A-1F depict representative reforming reactors comprising heating elements extending in a vertical direction, or which may otherwise extend in the same direction as an overall or bulk flow direction of a gaseous reaction mixture through the reactors.

Embodiments of the invention are directed to electrically heated reforming reactors having features and associated advantages as described above. As shown in FIG. 1A, a representative reactor 100 may comprise an outer shell 2 defining an interior space 4 that includes a catalyst bed volume 50 for containing catalyst, such as particles of a reforming catalyst as described herein. The reactor 100 further comprises a plurality of heating elements 5' that may extend partly or completely through the catalyst bed volume 50 and may be configured for heating separate regions within the reactor. In general, an electrically heated reforming reactor may comprise such outer shell defining an interior space that includes the catalyst bed volume, which may, for example, be disposed centrally, at least in a radial dimension, about the interior space. In general, the reactor may comprise at least one heating element extending through the catalyst bed volume and extending unidirectionally. For example, one heating element may extend unidirectionally and centrally, at least in a radial dimension, about the interior space and about the catalyst bed volume (e.g., along the central axis of the interior space and catalyst bed volume, both of which may generally be cylindrical, although other geometries are possible). Optionally, additional heating elements may extend, typically in the same direction as the one heating element and as each other, through other regions of the catalyst bed volume to provide a desired degree of heat input and temperature control in desired regions.

Whether one or a plurality of heating elements are present, these heating elements include an electrically conductive material, such as a suitable metal or alloy. Metals or alloys forming the electrically conductive material may comprise, for example, one or more of Cu, Ag, Al, Cr, Fe, and Ni, and are capable of withstanding reforming temperatures described herein, with specific examples including nichrome (alloy of nickel and chromium) or kanthal (alloy of iron, chromium, and aluminum).

Representative heating elements may be elongated in one dimension (e.g., according to which one dimension is at least an order of magnitude greater, such as at least two orders of magnitude greater, than other dimensions), and therefore may be in the form of a resistance wire or rod (having a length dimension much greater than a radial dimension). Other heating elements may be elongated in two dimensions (e.g., according to which two dimensions are at least an order of magnitude greater, such as at least two orders of magnitude greater, than the other dimension), such as those in the form of planar heating elements having a flat surface or elements having a curved surface (e.g., having length and width dimensions, or length and circumference dimensions, that are much greater than a thickness dimension). Examples include rectangular planar or circular planar heating elements (elongated in width and length dimensions or elongated in angular and radial dimensions), as well as tubular heating elements (elongated in circumferential and length dimensions). These heating elements may likewise be made of such suitable metal or alloy as described above, for example in the case of such metal or alloy being coated or printed (e.g., as a metal/alloy-loaded paste) onto a substrate (e.g., of metal, glass, ceramic, or polymer) that is elongated in two dimensions. The combination of the electrically conductive material and substrate may be characterized as a thick film heating element, as such term is generally used in the art.

Regardless of their particular form, representative heating elements may have an insulating layer surrounding the electrically conductive material, such that this material does not directly contact the catalyst but nonetheless transfers heat to the catalyst. The insulating layer may comprise a ceramic material such as a refractory metal oxide, for example aluminum oxide, silicon oxide, or magnesium oxide. Alternatively, or in addition, the heating elements may include a coating layer, tube, or sheath surrounding the electrically conductive material, and optional insulating layer. Alloys of copper, nickel, or stainless steel such as Incoloy®, Inconel®, Hastelloy®, or Monel® may be used as such coating layer, tube, or sheath. For example, a specific heating element in the form of a wire or rod may have a central or core electrically conductive material, which is surrounded by an intermediate insulating layer, which, in turn, is surrounded by an external coating layer.

In general, heating elements are configured such that the electrically conductive material does not directly contact the catalyst, whereas an insulating layer or coating layer may contact the catalyst. Representative heating elements also generally do not have catalyst adhered to their surfaces or otherwise have a catalytic support material, such as a base material onto which catalyst particles are washcoated, adhered to their surfaces. That is, in preferred embodiments, the heating elements and catalyst are structurally distinct, for example in the case of catalyst particles being loaded into the reforming reactor and surrounding heating elements initially present in the reforming reactor (e.g., extending partly or completely through the catalyst bed volume) but not being physically attached or adhered to the heating elements. Particles of reforming catalyst may have a form (shape) and dimensions suitable for use in a fixed bed. In the case of spherical catalyst particles, these may have a diameter for example, in the range generally from about 1 mm to about 10 mm, typically from about 1 mm to about 5 mm, and often from about 1 mm to about 3 mm. Catalyst particles having other geometries and also suitable for use in a fixed bed, include cylindrical catalyst particles (e.g., when prepared by extrusion). If cylindrical, catalyst particles may have a diameter within any of the ranges for diameter given above, with respect to spherical catalysts. For example, extrudates may be formed having diameters of 1.59 mm (1/16 inch), 3.18 mm (1/8 inch), or 6.35 mm (1/4 inch). Cylindrical catalyst particles may also have a length generally from about 1 mm to about 10 mm, typically from about 1 mm to about 5 mm, and often from about 1 mm to about 3 mm.

Heating elements, and particularly the one heating element or plurality of heating elements used in any of the embodiments described herein, may be resistive heating elements or inductive heating elements. In the case of resistive heating elements, a voltage source is used to provide alternating or direct current through the electrically conductive material, having sufficient resistance to result in the generation of a desired quantity of heat through Joule heating. Representative voltages that may be applied to the heating elements are in the range from about 50 to about 5000 volts, such as from about 100 to about 2500 volts or from about 200 to about 1000 volts. If one or more voltage sources are used to provide alternating current, representative frequencies are in the range from about 10 to about 1000 Hz, such as from about 25 to about 100 Hz or from about 50 to about 60 Hz. In the case of inductive heating elements, an energy source such as an electronic oscillator is used to provide alternating current through an electromagnet that establishes an alternating magnetic field, and induces eddy currents, within the electrically conductive material. These eddy currents, combined with the resistance of the electrically conductive material, result in the generation of a desired quantity of heat through Joule heating. The electromagnet, or inductor, which is coupled to the energy source, may be in the form of a coil that is wound around the electrically conductive material, such as wound around an intermediate insulating layer of a heating element and/or an external coating layer of a heating element, according to particular embodiments described above. In view of this and the overall disclosure of various embodiments herein, the one or more (e.g., a plurality of) heating elements may be in the form of a resistive or inductive wire or rod, such as a solid wire or rod that does not contain or surround catalyst particles or any portion of the catalyst bed volume. In other embodiments, the one or more heating elements may be in the form of a plate, such as a rectangular or circular plate that may be formed by printing of electrically conductive material, or by thick film element manufacturing techniques generally. In further embodiments, the one or more heating elements may be in the form of varyingly sized tubular members, such as tubes of varying diameter and optionally having substantially constant lengths. Such tubes may contain or surround catalyst particles.

Optionally, in the case of resistive heating, the voltage source may be used to generate desired quantities of heat at only selected portions of the electrically conductive material of one or more heating elements, such as in linear segments of heating elements that are elongated in one dimension or in areal segments of heating elements that are elongated in two dimensions. Otherwise, varying quantities of heat may be generated at different, one- or two-dimensional portions of the electrically conductive material, such as these linear or areal segments, rather than heat being generated at some segments but not at other segments. Such objectives may be realized, for example, through the use of multi-zone heating elements. Alternatively, multiple voltage sources may be used to independently control heat input at separate linear or areal segments along a given line or within a given plane extending through the catalyst bed volume. The generation of desired quantities of heat at only selected portions, or the generation of varying quantities of heat at different portions, of the electrically conductive material of one or more heating elements may also be realized, in the case of inductive heating, if the electromagnet, or inductor, induces eddy currents at such selected portions, or induces varying eddy currents at such different portions. In this manner, heating of particular or targeted regions within the catalyst bed volume through resistive and/or inductive heating may be enhanced.

From the embodiment shown in FIG. 1A, it can be appreciated that the reactor 100 may comprise a reformer feed inlet 10 and a reformer product outlet 20, which, in combination are configured for flowing a gaseous mixture (gaseous reaction mixture) in an overall or bulk flow direction, which corresponds to the direction of the arrows associated with reformer feed inlet 10 and reformer product outlet 20. Whereas FIG. 1A depicts a reactor configured for flowing the gaseous mixture in a downward direction (i.e., a downflow reactor), in other embodiments other flow configurations are possible, such as in the case of an upflow reactor or a reactor configured for horizontal flow. Reformer feed inlet 10 and/or reformer product outlet 20 may cooperate with other structures within the reactor, such as to distribute, guide (e.g., channel), and/or collect the gaseous mixture before, during, and after its passage cross catalyst bed volume 50. These structures may, for example, include feed inlet distributor 12 and product outlet collector 22. As further shown in FIG. 1A, catalyst bed volume 50 may be disposed centrally about interior space 4, such as centrally at least with respect to a width (e.g., radial) dimension. For example, catalyst bed volume 50 may be disposed radially inwardly, and optionally centrally, with respect to a peripheral insulating layer 75, comprising a heat (thermal) insulating material such as a ceramic, glass fibers, other inert or refractory material, and/or a gas barrier. Peripheral insulating layer 75 reduces thermal losses to the surroundings and, according to some embodiments, may allow the reactor to operate substantially adiabatically when used in the production of synthesis gas, according to processes described herein. Peripheral insulating layer 75 furthermore allows such processes to be operated with outer shell 2 of reactor 100 being at a substantially lower temperature compared to that within the catalyst, thereby relaxing the maximum temperature specification of materials used in the reactor construction as well as improving the ease with which the reactor may be handled during or around the time of operation.

Also according to the shown, front cut-out view of FIG. 1A, along the plane of the page that provides a view of the reactor interior following the removal of a front section, one or more heating elements 5' extend unidirectionally (e.g., along a straight line without changing direction, such as by bending or curving) in the overall bulk flow direction, which in the specific embodiment of FIG. 1A is the vertical direction. In general, the plurality of heating elements 5' may extend over at least a portion (e.g., at least about 30%, at least about 50%, at least about 70%, or at least about 90%) of a length of the catalyst bed volume 50, which may be the length from its inlet end 6a (e.g., the vertical position corresponding to this inlet end) to its outlet end 6b (e.g., the vertical position corresponding to this outlet end), with such length being, for example, in the vertical direction. As shown in the embodiment of FIG. 1A, these heating elements 5' may extend over substantially all or all of this entire length. The amount of extension across the catalyst bed volume length may impact the degree to which heat can be input, and temperature can be controlled, in regions from the axial center of the catalyst bed volume to regions disposed above and below the axial center.

Figure 2A:
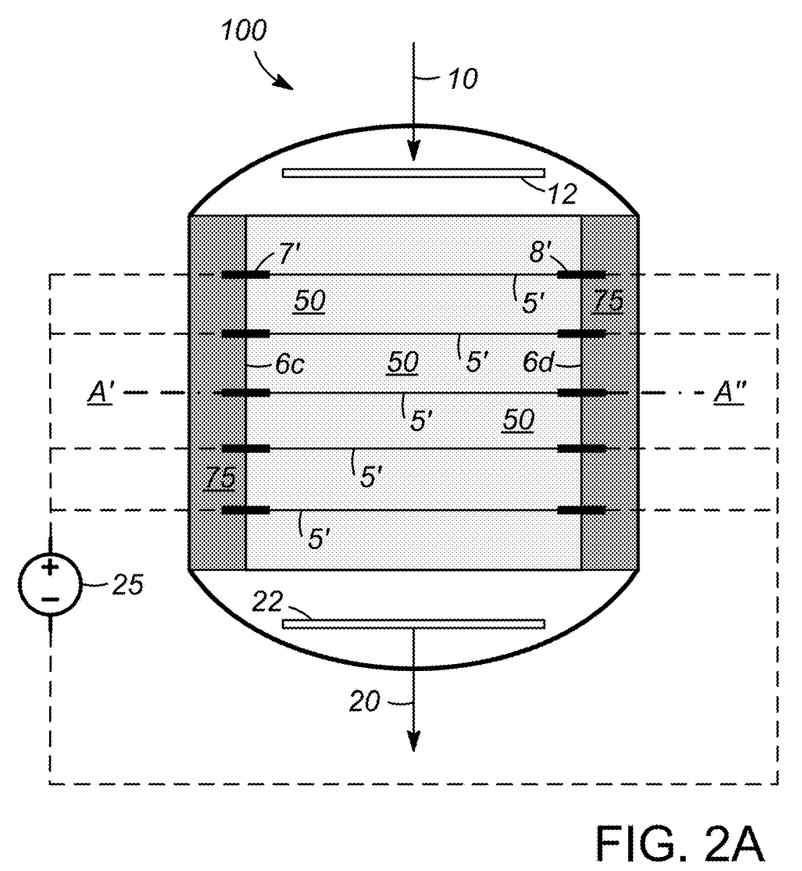
FIGS. 2A-2E depict representative reforming reactors comprising heating elements extending in a horizontal direction, or which may otherwise extend in a direction perpendicular to an overall or bulk flow direction of a gaseous reaction mixture through the reactors.

According to other embodiments, a plurality of heating elements 5' may extend unidirectionally, partly or completely through the catalyst bed volume, but in a direction that differs from the overall flow direction. This overall flow direction may, for example in the embodiment of FIG. 1A, be more particularly an axial direction with respect to a cylindrical portion of the interior space defined by the outer shell, which cylindrical portion contains the catalyst bed volume 50 (and catalyst bed itself during operation). As one example of heating elements 5' extending in a direction that differs from the overall flow direction, according to the embodiment shown in FIG. 2A, the one or more heating elements 5' may each extend unidirectionally over at least a portion (e.g., at least about 30%, at least about 50%, at least about 70%, or at least about 90%) of a width of the catalyst bed volume 50. This may be the width from a first peripheral edge 6c to a second, opposite peripheral edge 6d at the same axial position (e.g., vertical height) and disposed at a distance from first peripheral edge 6c. Such width may, for example, be in the horizontal direction and may, more particularly, correspond to a distance across a horizontal cross section of catalyst bed volume 50, with the overall flow direction being perpendicular to this horizontal cross section. In a particular embodiment, the widths or portions thereof, over which heating elements 5' extend, may correspond to a diameter or chord of a circular horizontal cross section of catalyst bed volume 50. As shown in the embodiment of FIG. 2A, heating elements 5' may extend over substantially all or all of such width. The amount of extension across the catalyst bed volume width may impact the degree to which heat can be input, and temperature can be controlled, in regions from the radial center of the catalyst bed volume to regions disposed peripherally from the radial center.

As shown in the embodiments of FIG. 1A and FIG. 2A, opposite ends of each heating element 5' may be electrically coupled to respective, electrical leads 7', 8' (e.g., using a mechanical, welded, or brazed connection), with positive leads 7' being further coupled to a positive terminal of voltage source 25 and negative leads 8' being further coupled to a negative terminal of voltage source 25. Electrical leads 7', 8' generally comprise materials, particularly metals, having a lower electrical resistance compared to the electrically conductive materials of heating elements 5', as described above. Whereas, in the embodiments of FIGS. 1A and 2A, positive leads 7' and negative leads 8' are commonly coupled to voltage source 25, it is also possible for multiple voltage sources to be coupled with, or control, respective multiple heating elements 5' or for a single voltage source to be coupled with, or control, multiple heating elements 5'. That is, according to particular embodiments, including specific embodiments described below, the plurality of heating elements 5' may include one or more individually controllable heating elements, for example one or more heating elements being controlled by its individual (single) voltage source that is configured to provide an independent (e.g., constant or time varying) voltage to that/those heating element(s). According to other particular embodiments, also including specific embodiments described below, the plurality of heating elements 5' may include one or more individually controllable groups heating elements, for example one or more groups being controlled by its individual (single) voltage source that is configured to provide an independent (e.g., constant or time varying) voltage to that/those groups of heating element(s). Representative groups include those heating elements 5' extending in a common plane (e.g., a common vertical plane or common horizontal plane that may be, respectively, parallel or perpendicular to the overall flow direction) or common cylindrical surface within the reactor.

To the extent that individual heating elements, or groups of heating elements, are described herein as being individually controllable in connection with a voltage source, such as in the case of resistive heating elements, the same individual heating elements or groups of heating elements, according to other embodiments, may likewise be individually controllable in connection with an energy source (e.g., an electronic oscillator), such as in the case of inductive heating elements.

Figure 1B:
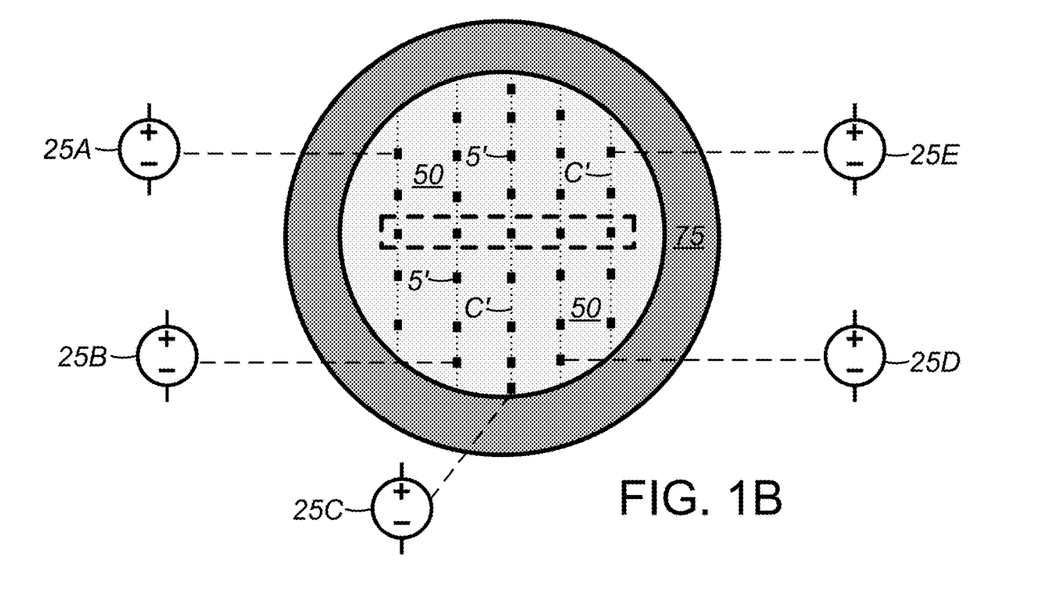

FIG. 1B depicts a specific example according to the embodiment of FIG. 1A, and in particular provides an exemplary top cut-out view across central plane A'-A" dividing the reactor into top and bottom sections. The central set of heating elements 5', which are also shown in the front cut-out view of FIG. 1A, are surrounded by a dashed box for reference. As further shown, additional heating elements 5', extending in the same direction (i.e., through central plane A'-A"), are positioned along common chords C' of a circular cross section of catalyst bed volume 50. Heating elements 5' along common chords C' are connected by fine dots, showing these chords for reference purposes in FIG. 1B, and such common chords C' may include a diameter of the circular cross section. With reference to the circular cross section of catalyst bed volume 50, one or more groups of heating elements 5' may be positioned along at least about 50%, at least about 70%, or at least about 90% of the length of their respective, common chords, with this parameter impacting the degree to which heat can be input, and temperature can be controlled, throughout a horizontal cross-sectional area of the catalyst bed volume. FIG. 1B therefore provides a specific embodiment that illustrates groups of heating elements (or subsets of the total heating elements) along common chords C' being individually controllable by respective voltage sources 25A, 25B, 25C, 25D, 25E to provide independent control of heat that is input to the catalyst bed volume through these groups. These groups along common chords C' may also be groups characterized by extending in respective, common vertical planes that are parallel to the overall flow direction.

Figure 1C:
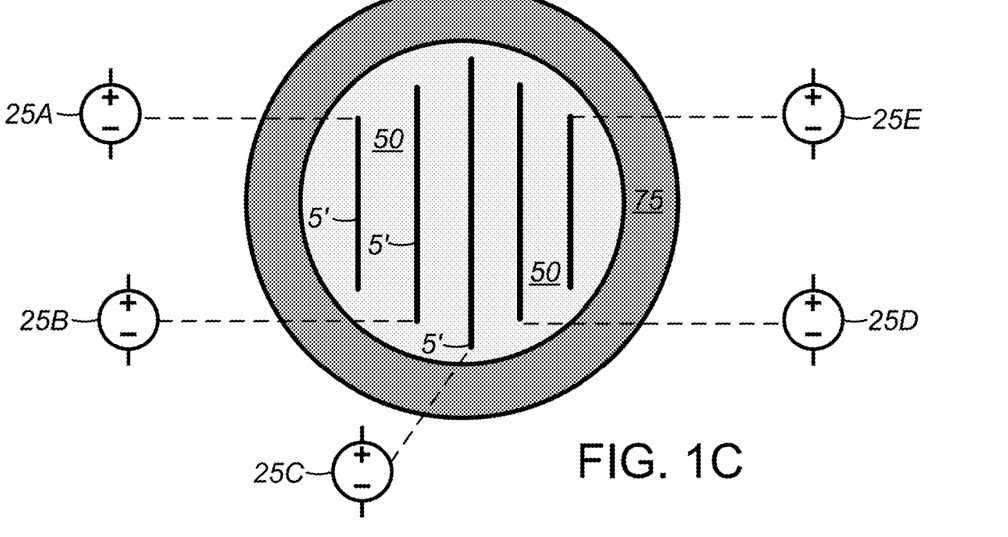

FIG. 1C depicts another specific example according to the embodiment of FIG. 1A, and, as in FIG. 1B, likewise provides an exemplary top cut-out view across central plane A'-A" dividing the reactor into top and bottom sections. According to this embodiment, heating elements 5' are planar (e.g., in the form of flat rectangles) and are elongated in not only an axial or length dimension (as in the case of heating elements 5' shown in FIGS. 1A and 1B), but also in a width dimension that corresponds to the dimension over which common chords C' extend in the embodiment of FIG. 1B. In the embodiment of FIG. 1C, each planar heating element 5' may be individually controllable by respective voltage sources 25A, 25B, 25C, 25D, 25E, to provide heat and temperature control in a manner similar to that described above with respect to the embodiment of FIG. 1B.

Figure 1D:
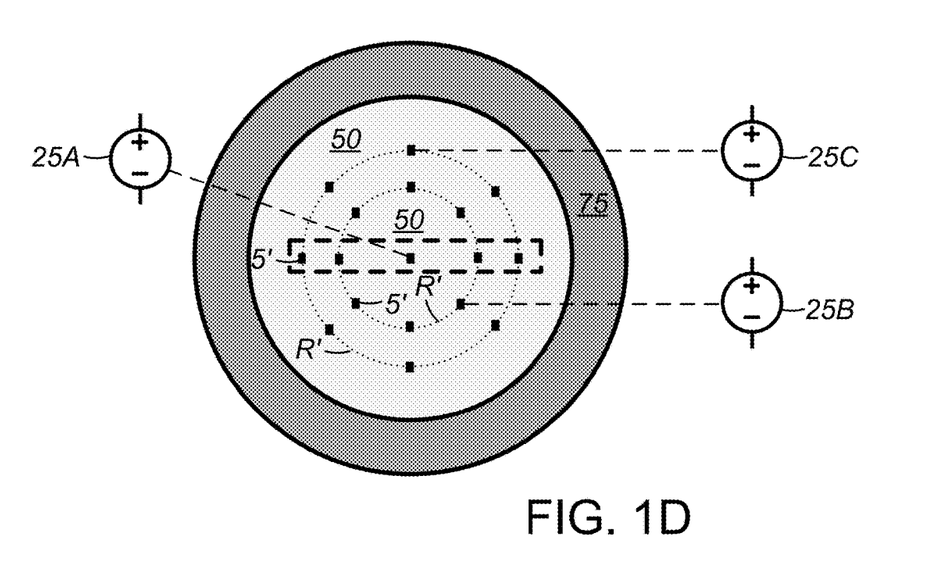

FIG. 1D depicts another specific example according to the embodiment of FIG. 1A, and, as in FIGS. 1B and 1C, likewise provides an exemplary top cut-out view across central plane A'-A" dividing the reactor into top and bottom sections. As in FIG. 1B, the central set of heating elements 5', which are also shown in the front cut-out view of FIG. 1A, are surrounded by a dashed box for reference. As further shown in the embodiment of FIG. 1C, additional heating elements 5', extending in the same direction (i.e., through central plane A'-A"), are positioned at common radii R' of circles that, in the plane of circular cross sections of catalyst bed volume 50 and interior space 4, are concentric with these circular cross sections. Heating elements 5' along common radii R' are connected by fine dots for reference purposes in FIG. 1D, although such heating elements 5' may also include a single, central heating element corresponding to a radius R=0. With reference to the circular cross section of catalyst bed volume 50, one or more groups of heating elements 5' may be positioned at varying radii extending outward to at least about 50%, at least about 70%, or at least about 90% of the radius of the catalyst bed volume 50, with this parameter impacting the degree to which heat can be input, and temperature can be controlled, at radial positions throughout a horizontal cross-sectional area of the catalyst bed volume. FIG. 1D therefore provides a specific embodiment that illustrates groups of heating elements (or subsets of the total heating elements) along common radii R' being individually controllable by respective voltage sources 25A, 25B, 25C to provide independent control of heat that is input to the catalyst bed volume through these groups. These groups along common radii R' may also be groups characterized as extending in respective, common cylindrical surfaces that are parallel to the overall flow direction. Heating elements may therefore extend axially (e.g., vertically in the overall flow direction) along a cylindrical portion of the interior space, or along a cylindrical portion of the catalyst bed volume, with such heating elements being spaced apart about a circumference of a circular cross section of the cylindrical portion. According to more specific embodiments, separate groups of heating elements extending axially along separate cylindrical portions may be spaced apart radially at regular intervals (e.g., radial intervals separated by a constant spacing distance). Otherwise, such separate groups may be spaced apart radially at irregular intervals, for example to provide heat input and/or temperature control preferentially toward the center of the catalyst bed volume or toward the periphery of the catalyst bed volume.

Figure 1E:
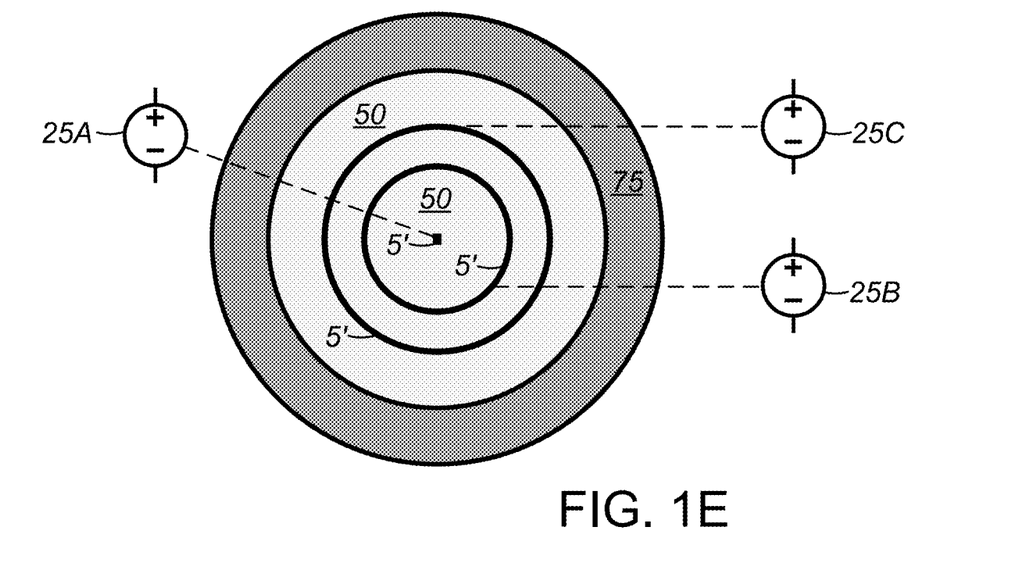

FIG. 1E depicts another specific example according to the embodiment of FIG. 1A, and, as in FIGS. 1B-1D, likewise provides an exemplary top cut-out view across central plane A'-A" dividing the reactor into top and bottom sections. According to this embodiment, heating elements 5' may include a single, central heating element. Alternatively, or in combination, heating elements 5' may include those having curved surfaces (e.g., in the form of tubes) that are elongated in not only an axial or length dimension (as in the case of heating elements 5' shown in FIGS. 1A-1D), but also in a circumferential dimension that corresponds to the dimension over which common radii R' extend in the embodiment of FIG. 1D. In the embodiment of FIG. 1E, the single, central heating element and/or each tubular heating element 5' may be individually controllable by respective voltage sources 25A, 25B, 25C, to provide heat and temperature control in a manner similar to that described above with respect to the embodiment of FIG. 1D.

Figure 1F:
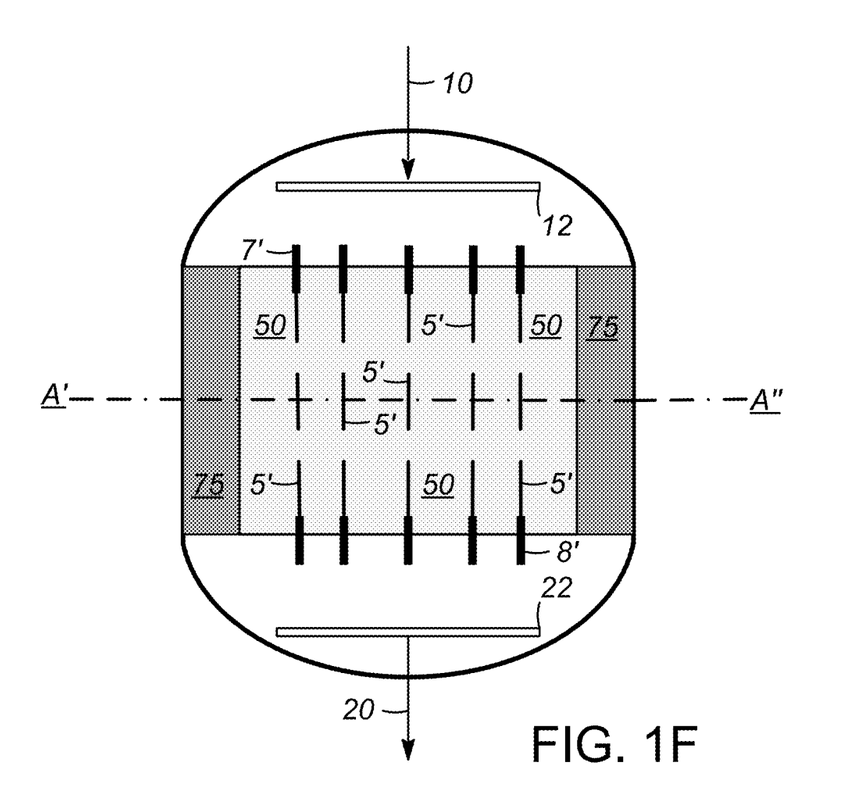

FIG. 1F depicts an embodiment as described above with respect to FIG. 1A, but in which heating elements 5' are in the form of linear segments extending in the direction as shown with respect to those shown in the embodiment of FIG. 1A. In the case of segments, desired quantities of heat may be generated at only selected axial positions of a given length across the catalyst bed volume. In the embodiment of FIG. 1F, separate voltages sources (not shown) may be used to control separate segments. Alternatively, a heating element may be configured to generate heat at only the selected axial portions, or alternatively may be configured to generate varying amounts of heat at different, selected axial portions, such as in the case of using multi-zone heating elements. Such embodiments afford a further degree of temperature control in the length or axial direction, using heating elements that extend in this direction. In an analogous manner, FIG. 2E depicts an embodiment as described above with respect to FIG. 2A, but in which heating elements 5' are in the form of linear segments extending in the direction as shown with respect to those shown in the embodiment of FIG. 2A. Such embodiments afford a further degree of temperature control in the width or radial direction, using heating elements that extend in this direction. As can be appreciated by those skilled in the art with knowledge of the present disclosure, further advantages reside in generating heat at only selected portions, or otherwise generating varying amounts of heat a different portions, of the specific heating element configurations shown in FIGS. 1B-1E and 2B-2D, which portions may correspond to linear segments of heating elements that are elongated in one dimension or to areal segments of heating elements that are elongated in two dimensions.

Figure 2B:
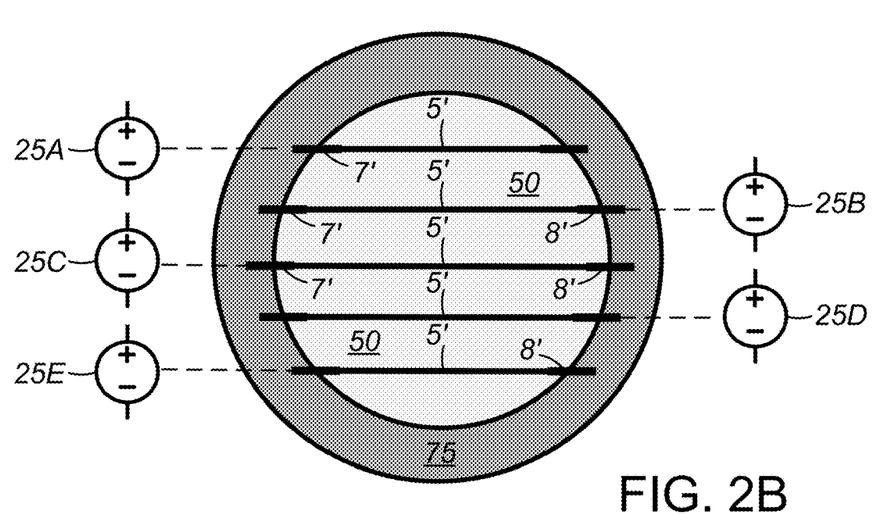

FIG. 2B depicts a specific example according to the embodiment of FIG. 2A, according to a characteristic cutout view across central plane A'-A" dividing the reactor into top and bottom sections. This view shows a central set of heating elements 5', each extending along chords of a circular cross section of catalyst bed volume 50, with such chords including a diameter of the circular cross section. FIG. 2B therefore provides a specific embodiment that illustrates a plurality of heating elements, extending in a common horizontal plane (or common cross section of catalyst bed volume 50), namely central plane A'-A" of FIG. 2A. Each element extends over substantially an entire width (e.g., a chord or diameter) of catalyst bed volume 50 and is individually controllable by respective voltage sources 25A, 25B, 25C, 25D, 25E to provide independent control of heat that is input to the catalyst bed volume through these heating elements 5'. These heating elements 5' may also be characterized as extending in a common horizontal plane that is perpendicular to the overall flow direction. Similar pluralities of heating elements 5' may extend horizontally and over at least a portion, such as over all or substantially all, of the width of the catalyst bed volume, but at vertical or axial positions other than that of central plane A'-A", such as above and/or below this vertical or axial position. For example, heating elements as shown in the view of FIG. 2A extend horizontally at axial positions both above and below that of central plane A'-A".

Heating elements may therefore extend radially (e.g., horizontally along chords of a circular cross section and perpendicular to the overall flow direction) with respect to a cylindrical portion of the interior space, or with respect to a cylindrical portion of the catalyst bed volume, and may be spaced apart axially at regular intervals (e.g., axial intervals separated by a constant spacing distance). Otherwise, such separate groups may be spaced apart axially at irregular intervals, for example to provide heat input and/or temperature control preferentially toward one end of the catalyst bed volume, relative to an opposite end. For example, intervals by which heating elements are spaced nearer to one end of the catalyst bed volume (or the reactor or its interior space) may be smaller relative to intervals by which heating elements are spaced nearer to the opposite end. According to a specific embodiments, intervals nearer an inlet end, communicating with reformer feed inlet 10 (whether the reactor is used in an upflow or downflow configuration) may be smaller relative to intervals nearer an outlet end, communicating with reformer product outlet 20, such as in the case of gradually increasing intervals from the inlet end to the outlet end. Such spacing of radially extending heating elements allows heat input and/or temperature control to be concentrated where heat demand and/or reaction heat consumption or production are often greatest.

Figure 2C:
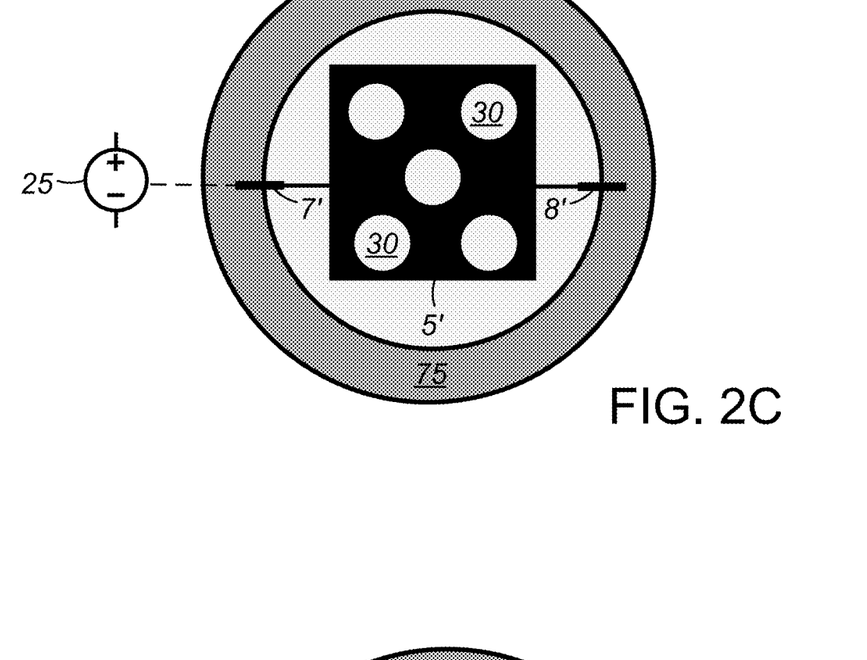
Figure 2D:
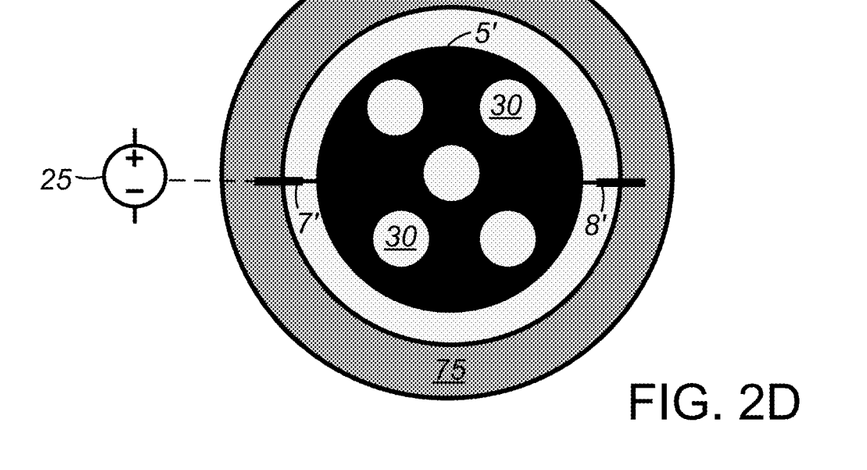
Figure 2E:
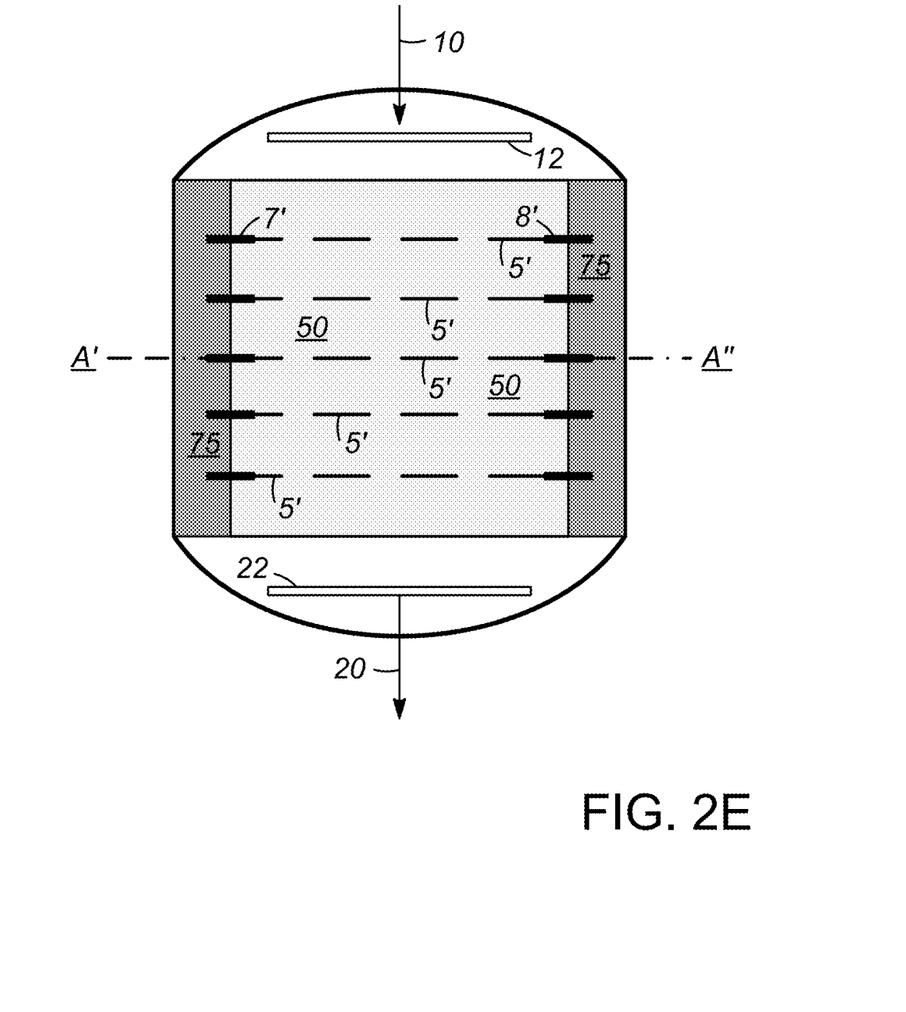

FIGS. 2C and 2D depict other examples according to the embodiment of FIG. 2A, according to other characteristic top cut-out views across central plane A'-A" dividing the reactor into top and bottom sections. These views each show a central planar heating element 5', and more particularly a central rectangular heating element in the embodiment of FIG. 2C and a central circular heating element in the embodiment of FIG. 2D, each extending over a portion of the circular cross section of catalyst bed volume 50, at central plane A'-A". These heating elements 5' are therefore elongated in two dimensions, namely width and length (or depth) dimensions or in angular and radial dimensions, respectively, in the embodiments shown in FIGS. 2C and 2D. These planar heating elements differ from those shown in the embodiment of FIG. 2B, in that the heating elements 5' shown in this figure are elongated in a single dimension as opposed to two dimensions. These planar heating elements also differ from the heating elements shown in the embodiments of FIGS. 1C and 1E that, although being elongated in two dimensions, have surfaces that are generally aligned in parallel with the overall flow direction (e.g., are parallel to this direction or have an elongated dimension that is parallel to this direction). In view of planar heating elements 5' having surfaces substantially perpendicular to the overall flow direction, such elements may further include openings 30 to accommodate the flow of the gaseous mixture through the catalyst bed volume, and such openings 30 may be sized to improve flow distribution of the gaseous mixture. In addition, similar planar heating elements may extend horizontally and over portions of circular cross sections of the catalyst bed volume, but at vertical or axial positions other than that of central plane A'-A", such as above and/or below this vertical or axial position. In this case, openings of heating elements 5', disposed above and/or below a given heating element 5', may be axially aligned or otherwise axially offset from openings 30 of that given heating element 5', depending on a specific operation. For example, axially offsetting openings may provide beneficial mixing effects, whereas axially aligning openings may reduce pressure drop.

According to still further embodiments, heating elements may be three-dimensional, such as in the form of block heaters that may be loaded into the catalyst bed volume. For example, elongated heating elements 5' according to the embodiment of FIG. 1A could be fabricated with a substantial diameter, or planar heating elements 5' according to the embodiments of FIGS. 2C and 2D could be fabricated with a substantial thickness (height in the axial dimension). In the latter case, holes 30 would more closely simulate catalyst tubes within a conventional reforming furnace, with the solid block providing the surrounding heat or such conventional reforming furnace.

Advantageously, electrically heated reforming reactors, optionally together with other (e.g., upstream and/or downstream) processing equipment, such as one or more upstream gas pretreatment vessels and/or a downstream Fischer-Tropsch (FT) synthesis reactor, may be made transportable (e.g., by air, sea, or land), in view of the possibility for compactness that arises through the use of electricity as a heat source, as opposed to a hydrocarbon fuel. Representative embodiments may therefore comprise transporting such reactors, and optionally associated equipment, to a remote site of a source of reformer feed, which is available in a quantity that is otherwise insufficient to be economically conveyed in, and processed in, locations of existing refinery-scale operations. These remote sites include, for example, wellheads and biomass digesters as sources of methane and other light hydrocarbons. Alternatively or in addition to upstream and downstream processing equipment, such associated equipment may include sufficient process and analytical instrumentation to control, monitor, and evaluate performance. In some embodiments, an electrically heated reforming reactor and associated equipment that is made transportable, may be fully operational upon commissioning (connection) with local sources of the reformer feed (e.g., purified or impure methane and steam), as well as electricity and possibly other utilities.

In representative embodiments, the electrically heated reforming reactor and optionally associated equipment, particularly process and analytical instrumentation, may be housed, or may be at least capable of being housed, within a container generally having a volume of less than about 10 $m^3$ (e.g., from about 2 $m^3$ to about 10 $m^3$), typically less than about 8 $m^3$ (e.g., from about 2 $m^3$ to about 8 $m^3$), and often less than about 6 $m^3$ (e.g., from about 2 $m^3$ to about 6 $m^3$). Overall, the improved simplicity and compactness of electrically heated reforming reactors described herein advantageously allows for their operation on a small scale, such that they may be transportable in some embodiments, for example by truck, ship, train, or plane, to a site of a suitable reformer feed (e.g., a wellhead or source of stranded natural gas). These reactors, and optionally associated equipment, may, in some embodiments, be mounted on a skid to facilitate their transport.

Further advantages arising from the use of multiple heating elements reside in the ability to compensate for inconsistencies in gas flow distribution that may arise in the case of catalyst beds having a large surface area, perpendicular to the gas flow, relative to axial length, parallel to the gas flow (e.g., a relatively large bed diameter to length ratio, or relatively small length to diameter ratio, L/D). For example, the control of temperature distribution in the radial dimension may be used to detect and/or offset the effects of flow channeling. This allows for greater flexibility in reactor design and particularly the dimensions of the catalyst bed volume, interior space, and the reactor itself. In some embodiments, the electric reforming reactor may be made relatively wide and short, optionally in conjunction with a correspondingly wide and short interior space and catalyst bed volume. For example, in the case of cylindrical reactor, having at least a central section in the form of a cylinder, the L/D of such cylindrical section, and/or the interior space or catalyst bed volume, may be less than about 10 (e.g., from about 0.5 to about 10), less than about 7 (e.g., from about 1 to about 7), or less than about 3 (e.g., from about 1 to about 3).

Reforming Processes

Other embodiments of the invention are directed to reforming processes, or processes for producing a synthesis gas product, comprising contacting a reformer feed comprising both (i) a hydrocarbon and (ii) $H_2O$ and/or $CO_2$ with a catalyst that is disposed in a catalyst bed volume of an electrically heated reforming reactor as described herein. For example, the catalyst bed volume (containing the reforming catalyst during operation) may have a plurality of heating elements extending partly or completely therethrough, in order to provide a desired degree of heat input and temperature control in desired regions of the catalyst.

Unlike conventional gas-fired furnaces, the heating elements may provide uniform or non-uniform heating that is particularly tailored to a given process, feed, desired product and/or performance, or changing reaction parameters. Representative processes may therefore comprise, utilizing a given configuration of heating elements (e.g., those configurations described herein), causing heating elements, disposed at different radial positions, to provide different rates of heat to the catalyst, and/or causing heating elements, disposed at different axial positions, to provide different rates of heat to the catalyst. Heat input may be based on the quantity of heat transferred per unit time (e.g., in joules/second or watts), or otherwise based on the quantity of heat transferred per unit time to each unit volume (e.g., in watts/cm$^3$) of catalyst. Representative processes may further comprise, following the contacting of the feed and catalyst to effect conversion by reforming, withdrawing the synthesis gas product.

In general, heating elements disposed at different radial positions may be used to control a radial temperature profile within the catalyst bed volume, whereas heating elements disposed a different axial positions may be used to control an axial temperature profile. However, as described above, for example in the case of using segmented or multi-zone heating elements, it is also possible to utilize heating elements disposed at different radial positions to control an axial temperature profile and/or to utilize heating elements disposed a different axial positions to control a radial temperature profile. In some cases, heating elements disposed at different radial positions may be used in conjunction with heating elements disposed at different axial positions. Reforming may be carried out, for example, with heating elements disposed at different radial positions or the heating elements disposed at different axial positions providing a greater rate of heat to an inlet end of the catalyst bed volume (e.g., communicating with the reformer feed inlet), relative to an opposite, outlet end. In particular embodiments, heat input may be increased within the first 10%, within the first 20%, or within the first 50%, of the axial length of the catalyst bed volume, relative to the heat input over the remaining axial length of the catalyst bed volume. Particularly in the case of an endothermic reforming reaction, the control of the axial temperature profile may result in this profile (e.g., along the catalyst bed centerline) having a minimum temperature that is increased relative to a minimum temperature that is obtained in a comparative baseline process, in which the same total heat input is provided to the catalyst uniformly. Like such comparative baseline process, the reforming process may be a substantially adiabatic process, due at least in part to the use of a peripheral insulating layer about the catalyst bed, as described above. The control of the axial temperature profile may, for example, eliminate a minimum bed temperature positioned downstream of the inlet end of the catalyst bed volume, such as in the case of the heating elements providing a steadily increasing axial temperature profile (e.g., along the catalyst bed centerline) from the inlet end to the outlet end. In general, according to representative reforming reactions, providing greater heat input nearer to the reactor inlet compared to the reactor outlet can reduce the temperature gradient, or temperature differential between the highest and lowest temperature within the catalyst bed (e.g., relative to a comparative baseline process as described above). This can lead to higher conversion of hydrocarbons under a given set of otherwise equivalent process conditions.

Further important advantages of electrically heated reforming reactors described herein and associated processes in which these reactors are used, include the ability to control different heat inputs over time during the course of a given process (e.g., in a time-dependent manner). Heat inputs to different regions within the catalyst bed volume may be controlled, for example, in response to wide variety of operating parameters that may change over time, including the composition of the reformer feed, the composition of the synthesis gas product, and/or an age or condition of the catalyst, in order to compensate for, or otherwise exploit, the effects of such changes. For example, heat input may be increased (e.g., to provide a maximum heat input) at an axial location that shifts over time from the inlet end to the outlet end of the catalyst bed, in order to compensate for catalyst deactivation that may occur in this direction, thereby improving overall utilization of the catalyst. Control of heat input in this manner may be based on an expected rate of catalyst deactivation over time. Alternatively, this control may be based on a temperature measurement within the catalyst bed, which indicates a location of initiation of the reforming reaction (e.g., a measurement of a low temperature resulting from initiation of an endothermic reaction). Otherwise, this control may be based on a measurement of another indicator of catalyst deactivation, such as a pressure drop across the reactor or catalyst bed, or a loss in conversion.

Heat input may be increased in a given region (e.g., at or near the inlet end of, at or near the outlet end or, or possibly in a central region of, the catalyst bed), in response to a change in composition of the reformer feed, such as an increase in a measured concentration of $H_2S$ or other component that may be detrimental to catalyst activity. Heat input may be increased in a given region (e.g., at or near the inlet end of, at or near the outlet end or, or possibly in a central region of, the catalyst bed), in response to a change in composition of the synthesis gas product, such as a decrease in a measured concentration of $H_2$, an increase in a measured concentration of hydrocarbon, or a measurement of another indicator of a loss in conversion. Heat input may otherwise be increased in a given region (e.g., at or near the inlet end of, at or near the outlet end or, or possibly in a central region of, the catalyst bed), in response to a change in any parameter (e.g., operating pressure or space velocity) that may impact process performance and particularly conversion.

According to particular examples of reforming processes, or processes for producing a synthesis gas product, the reformer feed may comprise (i) methane and/or other hydrocarbon(s) (e.g., any of $CH_4$, $C_2H_6$, $C_2H_4$, $C_3H_8$, $C_3H_6$, $C_4H_{10}$, $C_4H_8$, $C_5H_{12}$, $C_5H_{10}$, higher molecular weight hydrocarbons, and mixtures thereof) and (ii) $CO_2$. In this regard, it is possible that $CO_2$ alone can serve as the oxidant for the methane and/or other hydrocarbon(s) to CO and $H_2$ according to the dry reforming of such hydrocarbons, which in the case of alkanes, for example, can be generalized as:

$$C_nH_{2n+2} + nCO_2 \rightarrow 2nCO + (n+1)H_2.$$

In preferred embodiments, a combination of $CO_2$ and $H_2O$ can serve as the oxidant, that is, in embodiments in which the reformer feed further comprises $H_2O$. The reaction in this case is a "$CO_2$-steam reforming reaction," which also includes steam reforming as a route for producing syngas from methane and/or other hydrocarbons, which in the case of alkanes, for example, can be generalized as:

$$C_nH_{2n+2} + nH_2O \rightarrow nCO + (2n+1)H_2.$$

Whereas the theoretical molar $H_2$:CO ratio of a synthesis gas product formed from the dry reforming of methane is 1, the addition of steam reforming, in the $CO_2$-steam reforming of methane, advantageously provides the potential to increase this molar ratio to values more favorable for downstream Fischer-Tropsch synthesis to produce liquid hydrocarbons, according to:

$$(2n+1)H_2 + nCO \rightarrow C_nH_{2n+2} + nH_2O.$$

From this, it can be observed that $C_4^+$ hydrocarbons, such as $C_4$-$C_{12}$ hydrocarbons, which are desirable as liquid fuels or components of liquid fuels, are formed ideally at molar $H_2$:CO ratios approaching 2. By adjusting the relative amounts of $CO_2$ and/or $H_2O$ as oxidant, amounts of CO and/or $H_2$ in the reformer feed, and optionally other operating parameters and possibly using downstream conversions (e.g., the water-gas shift reaction), a synthesis gas product may be obtained having $H_2$:CO ratio in a range generally from about 0.75:1 to about 5:1, such as from about 0.75:1 to about 2.5:1, from about 1:1 to about 2.5:1, or from about 1.7:1 to about 2.3:1.

Representative reforming catalysts, which may be contained in a catalyst bed volume of an electrically heated reforming reactor as described herein, are therefore suitable for catalyzing the reaction of methane and/or other hydrocarbon(s) with $CO_2$ and/or $H_2O$. Particular catalysts may comprise a noble metal, and possibly two or more noble metals, on a solid support. The phrase "on a solid support" is intended to encompass catalysts in which the active metal(s) is/are on the support surface and/or within a porous internal structure of the support. The solid support preferably comprises a metal oxide, with cerium oxide being of particular interest. Cerium oxide may be present in an amount of at least about 60 wt-% and preferably at least about 75 wt-%, based on the weight of the solid support (e.g., relative to the total amount(s) of metal oxide(s) in the solid support). The solid support may comprise all or substantially all (e.g., greater than about 95 wt-%) of a combined amount of cerium oxide and one or more other metal oxides, such as aluminum oxide, silicon oxide, titanium oxide, zirconium oxide, magnesium oxide, strontium oxide, etc. Preferably, such other metal oxide is aluminum oxide. Other than cerium oxide and such one or more other metals oxide(s), additional components may also be present in the solid support, preferably in combined amounts representing a minor portion, such as less than about 10 wt-%, less than about 5 wt-%, or less than about 1 wt-%, of the solid support. In other embodiments, the solid support may comprise such other metal oxides alone or in combination, with a minor portion (e.g., less than about 50 wt-% or less than about 30 wt-%) of cerium oxide.

Noble metals are understood as referring to a class of metallic elements that are resistant to oxidation. In representative embodiments, the noble metal, for example at least two noble metals, of the catalyst may be selected from the group consisting of platinum (Pt), rhodium (Rh), ruthenium (Ru), palladium (Pd), silver (Ag), osmium (Os), iridium (Ir), and gold (Au), with the term "consisting of" being used merely to denote group members, according to a specific embodiment, from which the noble metal(s) are selected, but not to preclude the addition of other noble metals and/or other metals generally. Accordingly, a catalyst comprising a noble metal embraces a catalyst comprising at least two noble metals, as well as a catalyst comprising at least three noble metals, and likewise a catalyst comprising two noble metals and a third, non-noble metal such as a promoter metal (e.g., a transition metal). According to preferred embodiments, the noble metal is present in an amount, or alternatively the at least two noble metals are each independently present in amounts, from about 0.05 wt-% to about 5 wt-%, from about 0.3 wt-% to about 3 wt-%, or from about 0.5 wt-% to about 2 wt-%, based on the weight of the catalyst. For example, a representative catalyst may comprise the two noble metals Pt and Rh, and the Pt and Rh may independently be present in an amount within any of these ranges (e.g., from about 0.05 wt-% to about 5 wt-%). That is, either the Pt may be present in such an amount, the Rh may be present in such an amount, or both Pt and Rh may be present in such amounts.

In representative embodiments, the at least two noble metals (e.g., Pt and Rh) may be substantially the only noble metals present in the catalyst, such that, for example, any other noble metal(s) is/are present in an amount or a combined amount of less than about 0.1 wt-%, or less than about 0.05 wt-%, based on the weight of the catalyst. In further representative embodiments, that at least two noble metals (e.g., Pt and Rh) are substantially the only metals present in the catalyst, with the exception of metals present in the solid support (e.g., such as cerium being present in the solid support as cerium oxide). For example, any other metal(s), besides at least two noble metals and metals of the solid support, may be present in an amount or a combined amount of less than about 0.1 wt-%, or less than about 0.05 wt-%, based on the weight of the catalyst. Any metals present in the catalyst, including noble metal(s), may have a metal particle size in the range generally from about 0.3 nanometers (nm) to about 20 nm, typically from about 0.5 nm to about 10 nm, and often from about 1 nm to about 5 nm.

The noble metal(s) may be incorporated in the solid support according to known techniques for catalyst preparation, including sublimation, impregnation, or dry mixing. In the case of impregnation, which is a preferred technique, an impregnation solution of a soluble compound of one or more of the noble metals in a polar (aqueous) or non-polar (e.g., organic) solvent may be contacted with the solid support, preferably under an inert atmosphere. For example, this contacting may be carried out, preferably with stirring, in a surrounding atmosphere of nitrogen, argon, and/or helium, or otherwise in a non-inert atmosphere, such as air. The solvent may then be evaporated from the solid support, for example using heating, flowing gas, and/or vacuum conditions, leaving the dried, noble metal-impregnated support. The noble metal(s) may be impregnated in the solid support, such as in the case of two noble metals being impregnated simultaneously with both being dissolved in the same impregnation solution, or otherwise being impregnated separately using different impregnation solutions and contacting steps. In any event, the noble metal-impregnated support may be subjected to further preparation steps, such as washing with the solvent to remove excess noble metal(s) and impurities, further drying, calcination, etc. to provide the catalyst.

The solid support itself may be prepared according to known methods, such as extrusion to form cylindrical particles (extrudates) or oil dropping or spray drying to form spherical particles. Regardless of the specific shape of the solid support and resulting catalyst particles, the amounts of noble metal(s) being present in the catalyst, as described above, refer to the weight of such noble metal(s), on average, in a given catalyst particle (e.g., of any shape such as cylindrical or spherical), independent of the particular distribution of the noble metals within the particle. In this regard, it can be appreciated that different preparation methods can provide different distributions, such as deposition of the noble metal(s) primarily on or near the surface of the solid support or uniform distribution of the noble metal(s)

throughout the solid support. In general, weight percentages described herein, being based on the weight of the solid support or otherwise based on the weight of catalyst, can refer to weight percentages in a single catalyst particle but more typically refer to average weight percentages over a large number of catalyst particles, such as the number in a reactor that form a catalyst bed as used in processes described herein.

In the case of reformer feeds comprising methane, an important source of this methane is natural gas, and particularly stranded natural gas, which, using known processes, is not easily converted to a synthesis gas product in an economical manner. Natural gas comprising a relatively high concentration of $CO_2$, for example at least about 10 mol-% or even at least about 25 mol-%, may represent an attractive source of methane, since certain catalysts described herein perform sufficiently without the upstream removal of $CO_2$ (e.g., by scrubbing with an amine solution). Other sources of methane for reformer feeds may be obtained from coal or biomass (e.g., lignocellulose or char) gasification, from a biomass digester, or as an effluent from a renewable hydrocarbon fuel (biofuel) production process (e.g., a pyrolysis process, such as a hydropyrolysis processes, or a fatty acid/triglyceride hydroconversion processes). Further sources of methane may be obtained from a well head or an effluent of an industrial process including a petroleum refining process (as a refinery off gas), an electric power production process, a steel manufacturing process or a non-ferrous manufacturing process, a chemical (e.g., methanol) production process, or a coke manufacturing process. Generally, any process gas known to contain a hydrocarbon (e.g., a $C_1$-$C_3$ hydrocarbon), and optionally containing other gaseous components such as $CO_2$ may provide all or a portion of the reformer feed, or at least all or a portion of the methane component of this feed.

If the reformer feed comprises methane obtained from a renewable resource (e.g., biomass), for example methane from a process stream obtained by hydropyrolysis as described in U.S. Pat. No. 8,915,981 assigned to Gas Technology Institute, then processes described herein may be used to produce renewable synthesis gas products (i.e., comprising renewable CO) that, in turn, can be further processed to provide renewable hydrocarbon-containing fuels, fuel blending components, and/or chemicals. Accordingly, the reformer feed may therefore comprise methane from a non-renewable source (e.g., natural gas) and/or methane from a renewable source (e.g., biomass), with the latter source imparting an overall reduction in the carbon footprint associated with the synthesis gas product and downstream products. Natural gas and/or other sources of methane for reformer feeds may be, but need not be, pretreated to remove $H_2S$ and other sulfur-bearing contaminants, prior to reforming (e.g., dry reforming, steam reforming, or $CO_2$-steam reforming).

In representative embodiments, the reforming conditions may include a weight hourly space velocity (WHSV) generally from about 0.05 $hr^{-1}$ to about 10 $hr^{-1}$, typically from about 0.1 $hr^{-1}$ to about 4.0 $hr^{-1}$, and often from about 0.3 $hr^{-1}$ to about 2.5 $hr^{-1}$. As is understood in the art, the WHSV is the weight flow of the reformer feed divided by the weight of the catalyst in the reactor and represents the equivalent catalyst bed weights of the feed stream processed every hour. The WHSV is related to the inverse of the reactor residence time.

Other reforming conditions include an average catalyst bed temperature generally from about 649° C. (1200° F.) to about 816° C. (1500° F.), with particular temperatures throughout the catalyst bed preferably being governed primarily by the use resistive or inductive heating elements as described herein. Average catalyst bed temperatures described herein refer namely to the weighted average bed temperatures, accounting for the amount or weight fraction of catalyst at a given temperature. In more particular embodiments, the reforming conditions can include an average catalyst bed temperature in a range from about 677° C. (1250° F.) to about 788° C. (1450° F.), or from about 704° C. (1300° F.) to about 760° C. (1400° F.). As described above, the presence of $H_2S$ and/or other sulfur-bearing contaminants in significant amounts (e.g., 100-1000 mol-ppm) may warrant increased average catalyst bed temperatures, for example in a range from about 732° C. (1350° F.) to about 843° C. (1550° F.), or from about 760° C. (1400° F.) to about 816° C. (1500° F.), to maintain desired hydrocarbon conversion levels (e.g., greater than about 85%). Yet other reforming conditions can include an above-ambient pressure, i.e., a pressure above a gauge pressure of 0 kPa (0 psig), corresponding to an absolute pressure of 101 kPa (14.7 psia). Because the reforming reactions make a greater number of moles of product versus moles of reactant, equilibrium is favored at relatively low pressures. Therefore, reforming conditions can include a gauge pressure generally from about 0 kPa (0 psig) to about 517 kPa (75 psig), typically from about 0 kPa (0 psig) to about 345 kPa (50 psig), and often from about 103 kPa (15 psig) to about 207 kPa (30 psig).

The average catalyst bed temperature ranges given above are generally suitable for achieving a conversion of methane and/or other hydrocarbon(s) (e.g., a conversion of methane, a conversion of combined $C_1$-$C_3$ hydrocarbons, a conversion of combined $C_1$-$C_4$ hydrocarbons, a conversion of naphtha boiling-range hydrocarbons, a conversion of jet fuel boiling-range hydrocarbons, etc.) of at least about 80% (e.g., from about 80% to about 99%), at least about 85% (e.g., from about 85% to about 97%), or at least about 90% (e.g., from about 90% to about 99%), for example by adjusting the particular reactor or catalyst bed temperature (e.g., inputting more or less heat to various regions within the catalyst bed volume, using heating elements as described herein) and/or other reforming conditions (e.g., WHSV and/or pressure) as would be appreciated by those having skill in the art, with knowledge gained from the present disclosure. Advantageously, noble metal-containing catalysts as described herein are sufficiently active to achieve a significant hydrocarbon (e.g., methane) conversion, such as at least about 85%, in a stable manner at an average catalyst bed temperature of at most about 732° C. (1350° F.), or even at most about 704° C. (1300° F.). With respect to the oxidant reactants, a representative conversion of $CO_2$ is at least about 50% (e.g., from about 50% to about 75%), and a representative conversion of $H_2O$ is at least about 70% (e.g., from about 70% to about 90%/), at the conversion levels described herein with respect to hydrocarbon(s). As is understood in the art, conversion of any particular compound (e.g., methane) or combination of compounds (e.g., $C_1$-$C_4$ hydrocarbons or $C_1$-$C_3$ hydrocarbons) can be calculated on the basis of:

$$100*(X_{feed}-X_{prod})/X_{feed},$$

wherein $X_{feed}$ is the total amount (e.g., total weight or total moles) of the compound(s) X in reformer feed provided to the reactor and $X_{prod}$ is the total amount of the compound(s) X in the synthesis gas product withdrawn from the reactor. In the case of continuous processes, these total amounts may be more conveniently expressed in terms of flow rates, or total amounts per unit time (e.g., total weight/hr or total moles/hr). Other performance criteria that can be achieved using the electrically heated reforming reactor in combination with catalysts and reforming conditions as described herein include a high hydrogen yield, or portion of the total hydrogen in the methane and/or other hydrogen-containing compounds (e.g., total hydrogen in the hydrocarbons such as $C_2$-$C_4$ hydrocarbons or $C_2$-$C_3$ hydrocarbons), in the reformer feed provided to the reactor, which is converted to $H_2$ in the synthesis gas product withdrawn from the reactor. In representative embodiments, the hydrogen yield is at least about 70% (e.g., from about 70% to about 85%). As described above with respect to conversion, amounts provided to and removed from the reactor may be expressed in terms of flow rates.

In addition to a molar $H_2$:CO ratio within a range given above, representative synthesis gas products have a combined concentration of $H_2$ and CO of generally at least about 35 mol-% (or vol-%) (e.g., from about 35 mol-% to about 85 mol-%), typically at least about 50 mol-% (e.g., from about 50 mol-% to about 80 mol-%), and often at least about 60 mol-% (e.g., from about 60 mol-% to about 75 mol-%). As described above, the balance of the synthesis gas product may be substantially or all $CO_2$ and water, depending on the particular dry reforming process, including the conditions of such process (e.g., conditions within the reactor such as average catalyst bed temperature, pressure, weight hourly space velocity, and catalyst formulation) and the feed or gaseous mixture being reacted.

In representative embodiments, $CO_2$ is present in the synthesis gas product in a concentration of generally less than about 45 mol-% (e.g., from about 5 mol-% to about 45 mol-%) and typically less than about 35 mol-% (e.g., from about 10 mol-% to about 35 mol-%). Water may be present in a concentration of generally less than about 20 mol-% (e.g., from about 1 mol-% to about 25 mol-%) and typically less than about 15 mol-% (e.g., from about 5 mol-% to about 15 mol-%). Minor amounts of unconverted hydrocarbons may also be present in the synthesis gas product. For example, a combined amount of $C_1$-$C_4$ hydrocarbons (e.g., a combined amount of methane, ethane, propane, and butane), which may possibly include only $C_1$-$C_3$ hydrocarbons, may be present in a concentration of less than about 5 mol-% and typically less than about 2 mol-%.

Overall, aspects of the invention relate to electrically heated reforming reactors and their use in processes for producing synthesis gas products, according to which a number of benefits are gained, with respect to controlling heat input to specified regions within the catalyst bed and thereby tailoring a temperature profile along one, two, or three dimensions to achieve operating objectives and manage changes in process parameters. Other advantages of these reactors relate to their compactness, transportability, and ease of operation (e.g., rapid heat-up and commissioning of hydrocarbon reforming), adding to the flexibility in terms of reformer feed sources (e.g., sources of methane at remote locations) that may be economically processed. Those having skill in the art, with the knowledge gained from the present disclosure, will recognize that various changes can be made to the disclosed reactors and processes in attaining these and other advantages, without departing from the scope of the present disclosure. As such, it should be understood that the features of the disclosure are susceptible to modifications and/or substitutions without departing from the scope of the inventive aspects. The specific embodiments illustrated and described herein are for illustrative purposes only, and not limiting of the invention as set forth in the appended claims.

The invention claimed is:

1. A process for producing a synthesis gas product, the process comprising contacting a reformer feed comprising both (i) a hydrocarbon and (ii) $H_2O$ and/or $CO_2$ with a catalyst that is disposed in a catalyst bed volume having a plurality of inductive heating elements extending partly or completely therethrough and configured for inductive heating from an alternating magnetic field provided by an energy source, wherein said plurality of inductive heating elements include individualheating elements or groups of heating elements that are independently controllable for generating different amounts of heat at different radial positions or different axial positions within the catalyst bed volume, the process further comprising:

causing said individual heating elements or groups of heating elements to generate said different amounts of heat to the catalyst at said different radial positions, or causing said individual heating elements or groups of heating elements to generate said different amounts of heat to the catalyst at said different axial positions, and following said contacting, withdrawing the synthesis gas product.

2. The process of claim 1, wherein the individual heating elements or groups of heating elements that are independently controllable for generating differentamounts of heat at radial positions or the individual heating elements or goups of heating elements that are independently controllable for generating different amounts of heat at different axial positions provide a greater rate of heat at an inlet end of the catalyst bed volume, relative to an opposite, outlet end.

3. The process of claim 1, wherein the individual heating elements or groups of heating elements that are independently controllable for generating different amounts of heat at different radial positions control a radial temperature profile within the catalyst bed volume, or wherein the individual heating elements or groups of heating elements that are independently controllable for generating different amounts of heat at different axial positions control an axial temperature profile within the catalyst bed volume.

4. The process of claim 3, wherein controlling of the axial temperature profile results in the axial temperature profile having a minimum temperature that is increased relative to a baseline minimum temperature obtained by providing a same total rate of heat to the catalyst uniformly.

5. A process for producing a synthesis gas product, the process comprising, in an electrically reforming reactor, contacting a reformer feed comprising both (i) a hydrocarbon and (ii) $H_2O$ and/or $CO_2$ with a catalyst that is disposed in a catalyst bed volume having a plurality of heating elements extending partly or completely therethrough, wherein the plurality of heating elements provide different rates of heat to the catalyst that are controlled in a time-dependent manner, the process further comprising, following said contacting, withdrawing the synthesis gas product.

6. The process of claim 5, wherein the different rates of heat are controlled in said time-dependent manner, in response to a composition of the reformer feed, a composition of the synthesis gas product, or an age or condition of the catalyst.

7. The process of claim 5, wherein the plurality of heating elements are resistive heating elements or inductive heating elements.

8. The process of claim 5, wherein the plurality of heating elements include one or more individually controllable heating elements or one or more individually controllable groups of heating elements.

9. The process of claim 5, wherein the electrically heated reforming reactor further comprises a reformer feed inlet and a reformer product outlet, said reformer feed inlet and reformer product outlet configured for flowing the reformer feed in an overall flow direction, from an inlet end to an outlet end of the catalyst bed volume,
wherein the plurality of heating elements extend unidirectionally in the overall flow direction, over at least a portion of a length from the inlet end to the outlet end, or
wherein the plurality of heating elements extend unidirectionally in a direction that differs from the overall flow direction.

10. The process of claim 5, wherein the catalyst bed volume is within an interior space defined by an outer shell of the electrically heated reforming reactor, and wherein the plurality of heating elements extend axially with respect to a cylindrical portion of the interior space, and are spaced apart radially at regular or irregular intervals.

11. The process of claim 5, wherein the catalyst bed volume is within an interior space defined by an outer shell of the electrically heated reforming reactor, and wherein the plurality of heating elements extend radially with respect to a cylindrical portion of the interior space, and are spaced apart axially at regular or irregular intervals.

12. The process of claim 5, wherein the plurality of heating elements are in the form of resistive or inductive wires or rods.

13. The process of claim 5, wherein a heating element of said plurality of heating elements extends centrally through the catalyst bed volume.

14. A process for producing a synthesis gas product, the process comprising, in an electrically heated reforming reactor, contacting a reformer feed comprising both (i) a hydrocarbon and (ii) $H_2O$ and/or $CO_2$ with a catalyst that is disposed in a catalyst bed volume having a plurality of heating elements extending partly or completely therethrough,
wherein each of said plurality of heating elements comprises a core of electrically conductive material that is surrounded by a sheath that is an alloy of copper or nickel,
the process further comprising, following said contacting, withdrawing the synthesis gas product.

15. The process of claim 14, wherein the plurality of heating elements are resistive heating elements or inductive heating elements.

16. The process of claim 14, wherein the plurality of heating elements include one or more individually controllable heating elements or one or more individually controllable groups of heating elements.

17. The process of claim 14, wherein the electrically heated reforming reactor further comprises a reformer feed inlet and a reformer product outlet, said reformer feed inlet and reformer product outlet configured for flowing the reformer feed in an overall flow direction, from an inlet end to an outlet end of the catalyst bed volume,
wherein the plurality of heating elements extend unidirectionally in the overall flow direction, over at least a portion of a length from the inlet end to the outlet end, or
wherein the plurality of heating elements extend unidirectionally in a direction that differs from the overall flow direction.

18. The process of claim 14, wherein the catalyst bed volume is within an interior space defined by an outer shell of the electrically heated reforming reactor, and wherein the plurality of heating elements extend axially with respect to a cylindrical portion of the interior space, and are spaced apart radially at regular or irregular intervals.

19. The process of claim 14, wherein the catalyst bed volume is within an interior space defined by an outer shell of the electrically heated reforming reactor, and wherein the plurality of heating elements extend radially with respect to a cylindrical portion of the interior space, and are spaced apart axially at regular or irregular intervals.

20. The process of claim 14, wherein the plurality of heating elements are in the form of resistive or inductive wires or rods.

* * * * *